United States Patent
Appelt

[11] 3,745,601
[45] July 17, 1973

[54] AERIAL PIPELINE SYSTEM

[76] Inventor: Weldon F. Appelt, 2102 Quenby, Houston, Tex. 77005

[22] Filed: Feb. 11, 1972

[21] Appl. No.: 225,523

Related U.S. Application Data

[62] Division of Ser. No. 53,717, July 10, 1970.

[52] U.S. Cl. .................................. 14/77, 14/19
[51] Int. Cl. ........................................... E01d 19/02
[58] Field of Search ................ 14/77, 18, 19, 20

[56] References Cited
UNITED STATES PATENTS

| | | | |
|---|---|---|---|
| 510,674 | 12/1893 | Cameron | 14/18 X |
| 1,592,685 | 7/1926 | Schachenmeier | 14/19 |
| 2,221,919 | 11/1940 | Kenan | 14/19 |
| 2,641,784 | 6/1953 | Templeton | 14/19 |
| 2,960,704 | 11/1960 | Stoltenburg | 14/18 |

Primary Examiner—Nile C. Byers, Jr.
Attorney—Richard C. Sughrue et al.

[57] ABSTRACT

The aerial pipeline system provides for suspending large diameter pipe between a plurality of spaced towers across every conceivable type of terrain and in all climates. Each of the towers are of approximate A-frame configuration with an aerial tramway cable suspended between each tower through the opening between the legs of the tower for the purpose of transporting the pipe and other supplies during construction of the pipeline and for transporting inspection and maintenance personnel and supplies subsequent to construction. The pipeline will be suspended from the towers and extend through the opening between the legs. Depending upon the loading, the pipeline may be arranged for either vertical or horizontal expansion and contraction. A multiple section, hinged trolley beam is also disclosed for supporting and transporting long sections of pipe along the cable which is suspended in a sagging manner between adjacent towers. A smaller manually portable cable tramway is also provided for bringing in supplies for the construction of the pipeline.

2 Claims, 11 Drawing Figures

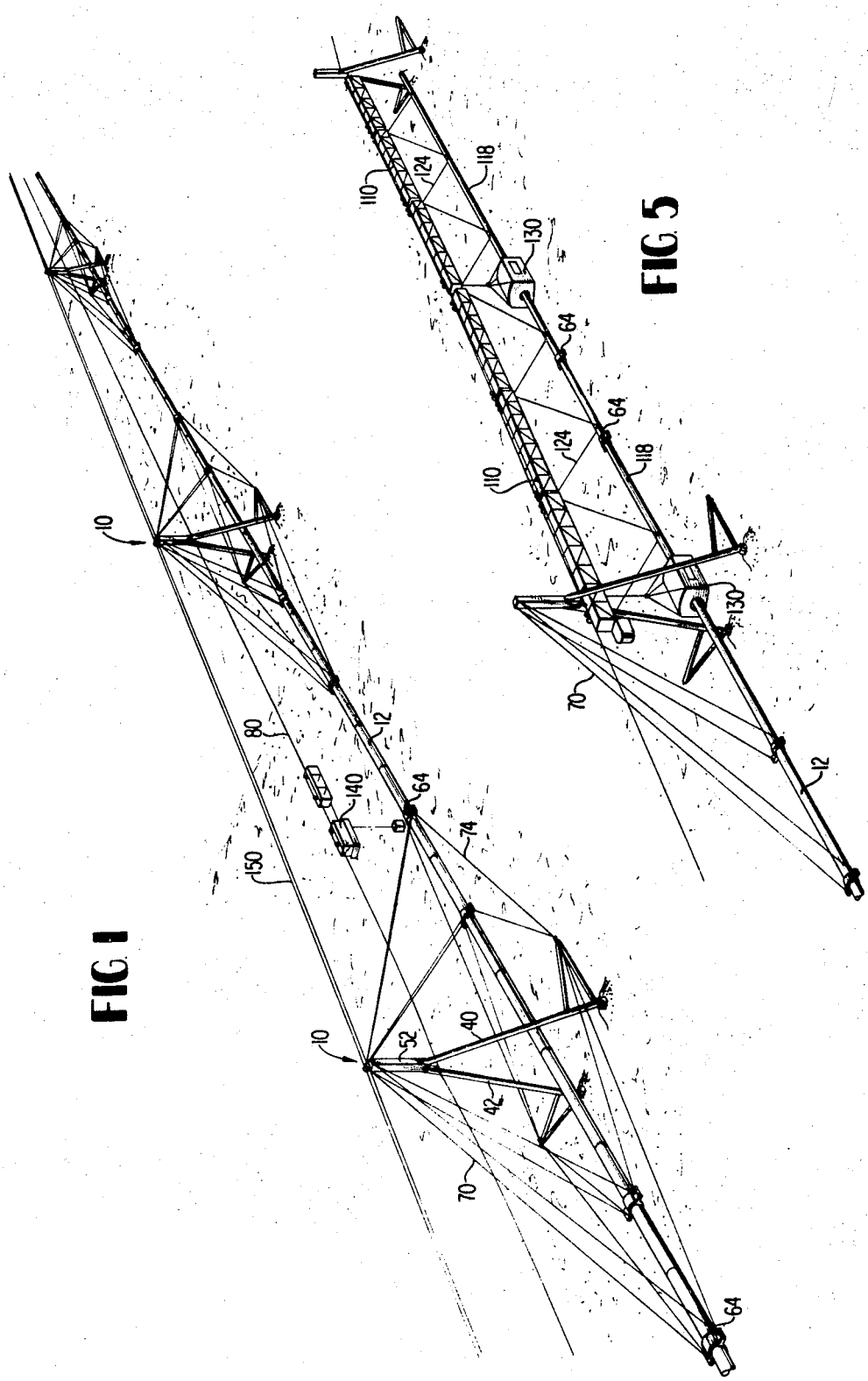

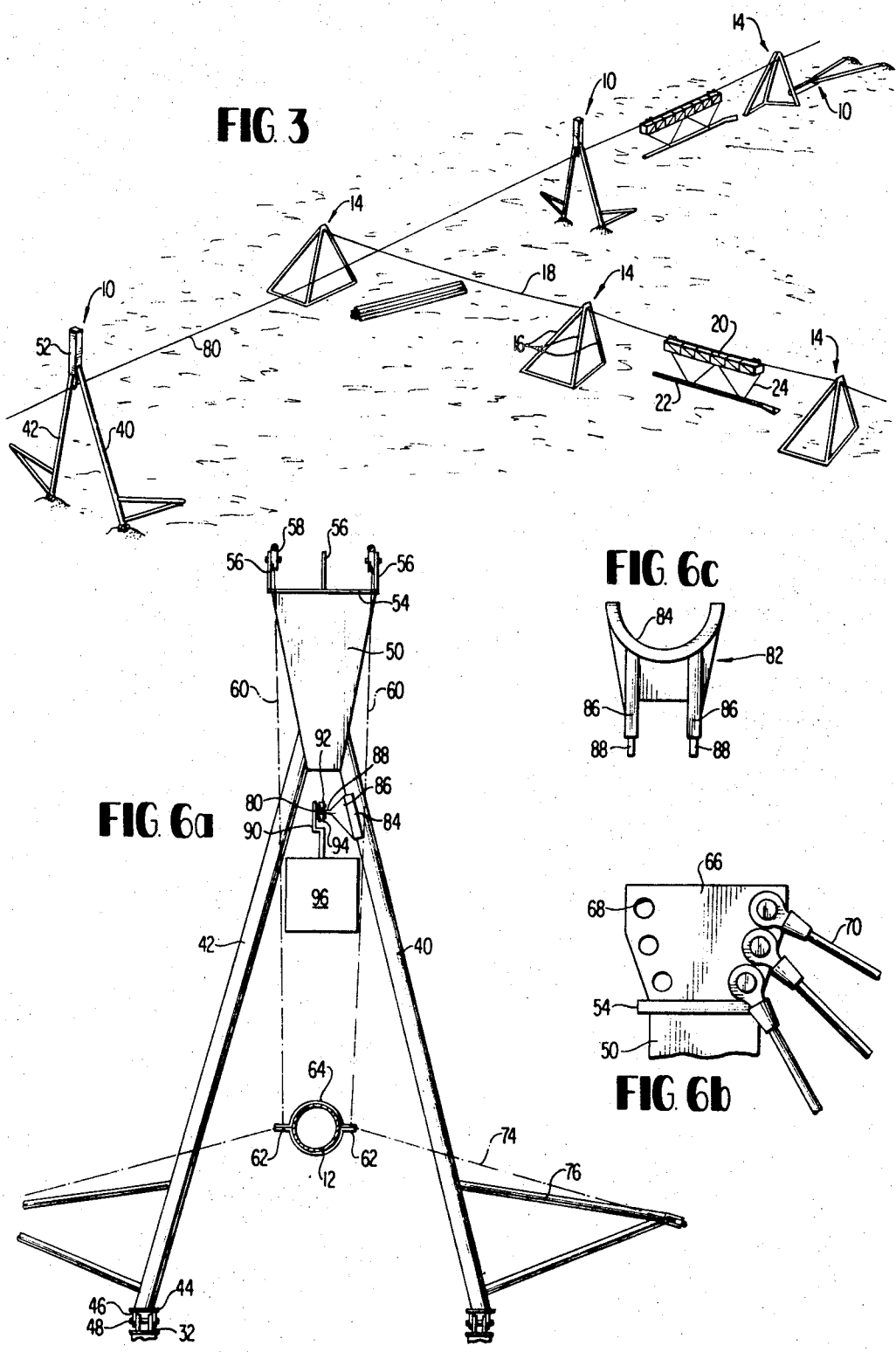

AERIAL PIPELINE SYSTEM

This is a Division of application Ser. No. 53,717, filed July 10, 1970.

BACKGROUND OF THE INVENTION

1. Field of the Invention

The present invention is directed broadly to pipeline systems and more specifically to aerial pipeline systems and the methods of constructing the same.

2. Prior Art

The most common type of pipeline system for transmitting fluids cross-country over great distances is the type wherein the pipeline is buried in a trench to define a substantially inflexible, immovable continuous conduit. Such a system is generally satisfactory in temperate climates and those areas having a generally level terrain with a relatively firm soil condition. The construction and maintenance problems, especially the cost thereof, greatly increase as the soil becomes more rocky and the terrain more rugged and mountainous. Likewise, the problems encountered by the trenching method of pipeline construction greatly increase in frozen soils (commonly known as permafrost), in swampy areas or areas which would involve a large number of river crossings.

The trenching method of pipeline construction is also much more damaging to the terrain and existing facilities. Frequently, the construction of a buried pipeline can cause severe and sometimes irreparable damage to the ecology of an area. Subsequent to the construction a break or leak in the buried pipeline can cause a great deal of damage to the ecology since such subterranean breaks and leaks are very difficult to detect or repair especially if the problem occurs in permafrost or in a remote rugged area which is not readily accessible by roads.

When oil is transported in large pipelines, especially in Artic areas, the oil obtains a temperature in the range of 140° to 190° F.. Such a high temperature can cause severe problems in an area where the trench for the pipeline is made through permafrost. Even with insulation, the amount of heat radiated from the pipeline will not allow the soil around the pipe to refreeze, thereby creating very unstable soil conditions along the entire length of the pipeline. Such a trench of unstable soil would readily be subject to hydraulic or thermal erosion and should a leak or break occur in the pipeline, the trench of unfrozen soil would provide a natural conduit for the leaking oil and channel the same to low lying areas with the subsequent pollution of streams and other bodies of water usually found in low lying areas. Furthermore, the heat radiated from the pipeline at a river crossing where the pipe is disposed beneath the surface of the water will cause thermal-pollution which has been proven in recent studies to cause damage to the ecology of the stream or river.

During the construction of the rivercrossing by underground pipeline methods, the natural stream banks and stream-side vegetation will be disturbed and the mere presence of the pipeline in the water might provide an unwanted concentration of water to increase the erosive effects of the stream on the banks. Often in the construction of an underwater pipeline crossing it is necessary to resort to blasting which can be harmful to the fish.

Another type of prior art pipeline system contemplates mounting the pipeline above the ground on a zigzag trestle. However, such a trestle in certain wild areas would act substantially as a fence across the countryside, thereby inhibiting the free movement of big game animals in their natural habitat. Also, this type of system obstructs the free movement of men in vehicles or on foot. Such a trestle type construction provides a relatively rigid support for the pipeline which often causes complications in the area of contraction and expansion of the pipeline. Finally, such a trestle type support for a raised pipeline is very poor from an esthetic point of view since, as pointed out above, it acts and appears as a large cumbersome fence stretching across the landscape.

SUMMARY OF THE INVENTION

The present invention provides an aerial pipeline system and a method of constructing the same which is far less expensive than the prior art methods and which will provide the least of disturbance to the ecology of an area both during construction and during the subsequent operation of the pipeline.

The pipeline, according to the present construction is comprised of a series of relatively light weight towers having a simple, yet esthetically pleasing configuration which will support the large diameter pipeline at a height above the ground while it will not interfere with the natural wild life or man's movement in the area or be suceptible to damage from the same. A cable is mounted between the towers between the spaced-apart legs of the towers so as to provide support for an aerial tramway which can be used not only for bringing construction materials into the site with the least amount of disturbance to the terrain but which can also be used subsequently for inspection and maintenance of the area pipeline.

In addition to this aerial tramway along the pipeline right-of-way, an additional lightweight, manually portable aerial tramway is also provided for transporting supplies to the right-of-way from supply sites or routes removed from the right-of-way such as aircraft landing areas or existing roads.

Portable assembly sites may be mounted at convenient locations along the length of the pipeline where the sections of pipe may be welded together into elongated pipeline sections equal to or less than the distance between the individual support towers and subsequently transported into position along the aerial tramway. In order to facilitate the transportation of such elongated sections of pipeline along a cable which sags between individual towers, a unique multiple section hinged trolley beam is provided for supporting the elongated section of pipeline without undue bending thereof while simultaneously distributing the weight of the pipeline section in the most advantageous manner along the cable to adjacent support towers.

Subsequent to the pipeline system, a trolley may be mounted for travel directly on the cable and if it is desired to eliminate the up and down movement of the trolley as it traverses the cable between adjacent towers provision is made for suspending a more rigid rail from the cable in a straight line from which the trolley may then be suspended.

According to the present invention, each individual tower is pivotally mounted on an axis transverse to the direction of the pipeline on suitable support plates resting on pilings located in drilled holes or driven into the ground or on other suitable foundation pads in those areas having a relatively soft soil structure or a soil structure having permafrost therein so that a plurality of towers can be raised into vertical position simultaneously by winching a construction cable or the trolley cable which is attached to each tower. Such a pivotal mounting for the towers provides the necessary flexibility for yielding movement in the direction of the pipeline while still providing for adequate lateral stability against wind forces and the like.

The pipeline system according to the present invention provides for supporting the pipeline from the towers in several different ways depending upon the weight of the load to be carried. For relatively light loads, the pipeline need only be supported by vertical cable means at each tower location with the pipe hanging freely between each tower location. For those pipelines carrying a greater load, additional support cables may be attached between the towers and the pipeline at locations intermediate adjacent towers. Under these conditions, the pipeline may be arranged for vertical movement upon expansion and contraction of the pipeline due to temperature changes and load changes, or the pipeline may be installed with a pre-set curvature or prestressed so as to expand laterally in opposite directions between adjacent towers to compensate for thermal-expansion and contraction while allowing for vertical displacement due to load variations.

The present invention provides a pipeline system which is economical to construct and which is suitable for all types of terrain, especially those areas involving a large number of ravine or river crossings and rough, rocky terrain.

The present invention provides a pipeline system which is extremely suitable for use in areas having permafrost, since the minimal support conditions provide for the least disturbance of the terrain and ecology of the area both during construction and the subsequent operation of the pipeline.

The present invention provides a pipeline system which is less likely to be damaged due to ground disturbances such as earthquakes or the like and which is accessible at all times for frequent visual inspections and for quick, economical and easy maintenance and repairs.

The present invention provides a pipeline system which simultaneously provides an aerial tramway between the support towers for the pipeline. The existing support towers for the pipeline can also be used as supports for power lines, communication lines, microwave relay devices and the like.

These and other objects will become more obvious in the course of the following description of the invention taken in conjunction with the attached drawings.

IN THE DRAWINGS

FIG. 1 is a perspective view of the completed aerial pipeline and tramway.

FIG. 3 is a perspective view showing the aerial tramway as used during construction of the pipeline and the portable auxiliary tramway for bringing in supplies.

FIG. 5 is a perspective view showing an assembly and welding phase of the pipeline construction.

FIG. 6a is an end elevation view of one of the towers for the aerial pipeline and tramway.

FIG. 6b is a side elevation view of the top of the tower showing a cable support plate thereon.

FIG. 6c is an end view of a half-sleeve cable supporting bracket.

DETAILED DESCRIPTION OF THE INVENTION

Figure 4:
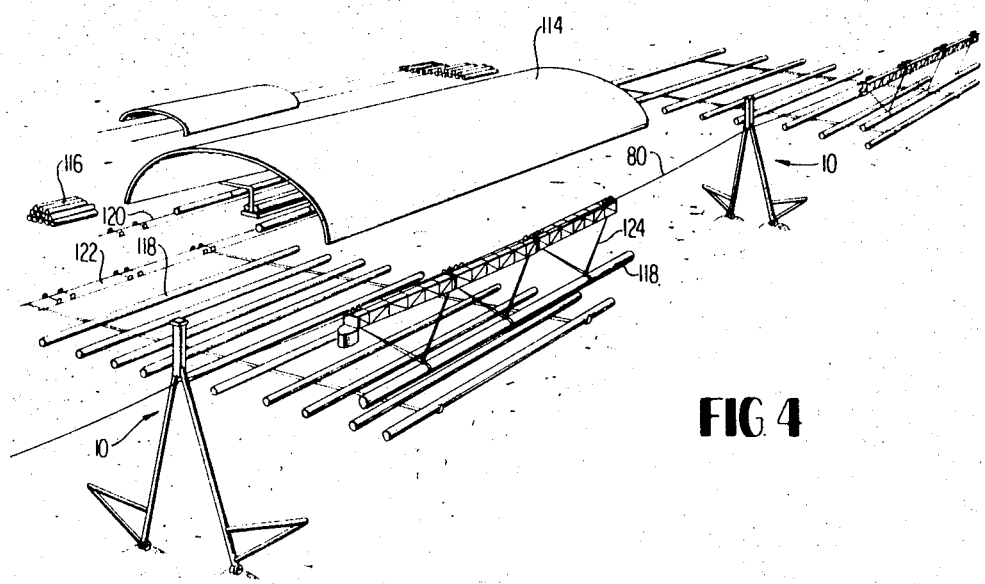
FIG. 4 is a perspective view of a portable assembly station adjacent the pipeline right-of-way.

FIG. 1 shows a perspective view of one form of the aerial pipeline system according to the present invention. A plurality of identical supporting towers generally designated at 10, are located substantially equidistant from each other for supporting the pipeline 12. The distance between the towers need not be identical thereby lending flexibility to the adaptation of the system to the specific terrain being traversed. The average distance the towers would be spaced apart for purposes of supporting a 48 inch pipeline will generally be in the range of 350 ft. to 420 ft. If a stream, a ravine or other similar obstacle is encountered, it can generally be spanned by using arrangements such as shown in FIG. 1. However, if the distances exceed the capacity of the system illustrated in FIG. 1, then a suspension type pipeline bridge may be resorted to since such a bridge would be completely compatible with the illustrated aerial pipeline system. Such suspension type pipeline bridges are well known in the art.

The present aerial pipeline system is not a restrained system wherein there is developed a longitudinal compressive stress due to thermal expansion or beam effects as would be encountered in the conventional pipe-line trench method. The present system is a special unrestrained system with small flexural beam stresses and negligible torsional stresses and provides very safe variable longitudinal tension and compression stresses. By utilizing the present system it is much easier to select a proper route since many advantages can be obtained by changing the direction of the pipeline in lateral directions as well as in the elevational direction which would not be available to normal ditching systems.

In the construction of the aerial pipelone according to the present invention, it is first necessary to prepare the right-of-way for construction. For the conventional buried pipeline, this usually involves the extensive cutting of trees and the massive disturbance of the topographical features of the land in order to build an access road. Thus, all of the vegetation would have to be cleared, low portions of the land filled and elevated portions of the land cut down. This massive disturbance ultimately leads to severe erosion problems and is detrimental to the ecology. This is especially true in areas around or above the Arctic Circle where a permafrost condition exists. If the vegetation is removed from the land in a permafrost area, the land would be able to absorb the warmth of the sun's rays and turn the entire cleared area into a quagmire. In the case of a pipeline or a road, removal of the vegetation would leave an elongated scar across the land which would never heal.

On the contrary, the present system ordinarily only involves the clearance of trees for the right-of-way since an access road along the right-of-way is not required. Furthermore, the aerial pipeline will follow the contour of the land much more readily than a buried pipeline and therefore eliminate the need for levelling the right-of-way. Therefore, there is no need to remove the top layer of vegetation from the land thereby preventing the melting of the permafrost.

The necessary supplies for building the aerial pipeline may be brought in by air, either to the exact point of construction by helicopter or to a nearby clearing, by conventional cargo planes. The supplies, in the latter case, or if an existing road is near the pipeline right-of-way, can then be transported to the actual construction site by means of a portable cable tramway. This portable tramway is best shown in FIG. 3 and is comprised of a plurality of towers indicated generally at 14. These towers are of lightweight construction and are each comprised of three legs 16 which may be connected together by any suitable means to form a tripod arrangement. Each leg 16, is light enough to be packed in manually or by mule to the desired location and assembled with the other legs. A cable 18, is strung between the towers beneath the apex of the tripod arrangement and may be supported from one of the legs 16, in a manner similar to the manner in which the cable is supported in FIG. 6. Such a mounting arrangement will be described more in detail hereafter. A trolley beam 20, is supported by the cable 18 by suitable support wheels and may be either propelled manually or by suitable power driven cable gripping means mounted on the trolley beam. A load 22, such as a length of pipe, is suspended below the trolley beam 20 by means of support cables 24, which are arranged to distribute the weight of the load along the length of the trolley beam.

Figure 2:
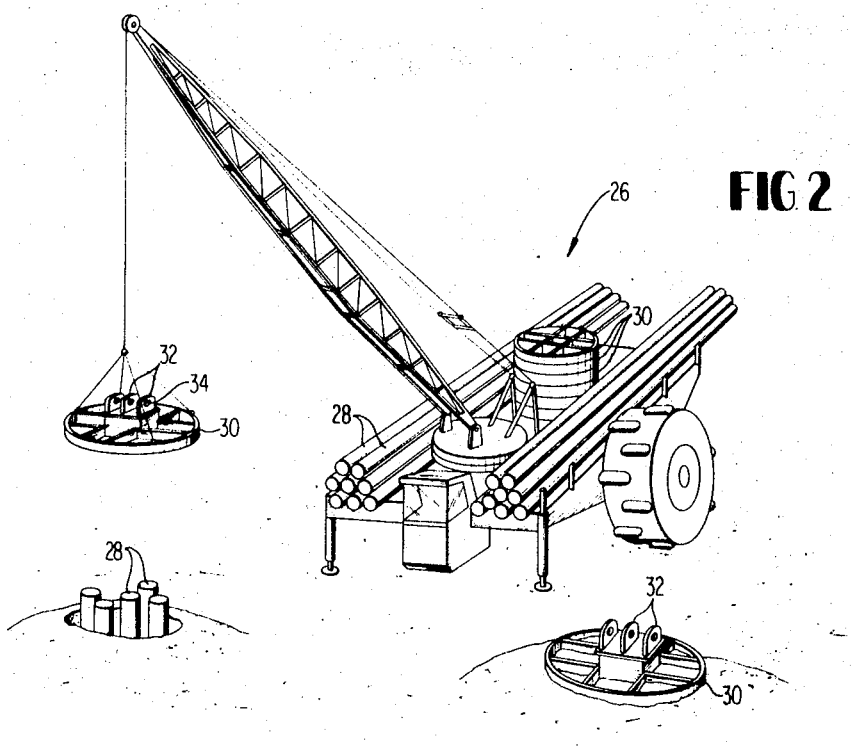
FIG. 2 is a perspective view showing the arrangement of the foundations for the towers for the aerial pipeline.

This portable tramway may also be utilized along a right-of-way to transport the pilings, main tower parts and the like into position prior to rigging the main cable support system. The only vehicles which will be used in the construction of the aerial pipeline will be on-the-road type vehicles such as the crane 26 as shown in FIG. 2. Similar vehicles carrying the pile driver and/or a drill may also be provided or a single vehicle having all of these attachments thereon or at least adapted to be mounted thereon in an interchangeable manner may also be provided. Usually the piling and foundation work will be done during winter weather conditions when the vegetation is covered with a thick layer of snow and the ground is frozen. Therefore, it would not be necessary to disturb the surface of the land to build an access road.

As shown in FIG. 2, a plurality of piles 28 are shown driven into the ground or placed in drilled holes depending upon the soil conditions at each tower location. In accordance with the illustrated example, two sets of five (more or less) piles are sunk in spaced-apart positions at each tower location and a cap 30 having pockets or openings for receiving the upper ends of each set of piles will be placed on and secured thereto by any suitable means. In permafrost areas, the piles are preferably wood piles thereby minimizing the chances of imparting heat to the surrounding permafrost from the piles thereby causing a melting of the permafrost which would create an unstable soil condition around the piles. In areas of hard rock, suitable pylons or other anchoring devices may be driven into the rock and the caps 30 secured thereto by any suitable means. A plurality of flanges 32 are provided on the upper surface of each cap and they are provided with apertures 34 for reception of a pintle. At each tower location the axes of the holes 34 in each cap will be aligned and extend transversely to the right-of-way.

The individual main towers 10, may be transported completely assembled to the tower location of helicopter or may be transported in pieces by the portable tramway, the off-the-road vehicles or any suitable means and assembled at the tower site. Each of the towers is comprised of a pair of main support legs 40 and 42 arranged in an inverted V-shaped configuration. Each of the legs may be constructed in a variety of ways, but the most preferable construction is that of hollow steel tubes to provide a light but very strong construction. A plate 44 is welded or secured by any other suitable means to the bottom of each leg and a pair of flanges 46 are secured thereto and depend downwardly therefrom. Each of the flanges 46 is provided with an aperture for receiving a pivot pin, the axis of which is transverse to the pipeline right-of-way. The flanges 46 are interleaved with the flanges 32 extending upwardly from the plate 30 secured to the support pilings and are pivoted relative thereto on pivot pin 48. The upper ends of the legs 40 and 42 are welded or secured by any other suitable means to a vertical extension 50 which is preferably comprised of a plurality of steel plates welded into a box-like configuration. As shown in FIG. 6, the extension 50 is provided with an inverted trapezoidal cross-section transverse to the pipeline in order to provide a broader top surface upon which the various cable attaching plates or pully supporting plates may be mounted. It is obvious that the upper portion of the towers could assume various configurations such as the rectilinear configuration 52 shown in FIG. 3. A plate 54 is mounted on the top of each of the upper tower sections 50 and as shown in FIG. 6a, a plurality of upright vertical plates 56 may be mounted thereon. Cable guiding pulleys 58 may be pinned to the plate 56 for roation thereon. It is preferable to mount the plate 56 which supports the pipe carrying cables at the outermost extremities of the plate 54 so as to provide as great a distance as possible between the downwardly extending cables 60 which are secured to flanges 62 on a sleeve 64 surrounding the pipe 12. Depending upon the number of pulleys needed for pipe supporting cables, the number of vertical plates 56 may vary and a single elongated pulley supporting shaft may be utilized instead of the individual pulley supporting shafts, as shown in FIG. 6a.

In some instances it is not necessary to guide the pipeline supporting cables over pulleys on the tops of the towers as shown in FIG. 6a, but it is preferable to anchor the pipeline supporting cables directly to the top of the individual towers. A cable anchor plate 66 is shown in FIG. 6b which extends parallel to the pipeline 12 and is provided with a plurality of holes 68 through which the ends of the pipeline supporting cables 70 may be anchored.

Depending upon the diameter of the pipeline involved, the material being carried by the pipeline and the distance between the support towers, the number of support cables in the type of cable attachment may vary. As shown in FIG. 1, four pairs of support cables are secured to the top of each tower in the manner shown in FIG. 6b with two pairs extending in each direction from the tower. Thus, the section of pipeline 12 between each pair of towers 10 is supported at four locations which are preferably equidistant from each other and the support towers. When larger spans and heavier loads are encountered, two additional pairs of cables may be secured to the top of each tower as shown in FIG. 6b.

Figure 7:
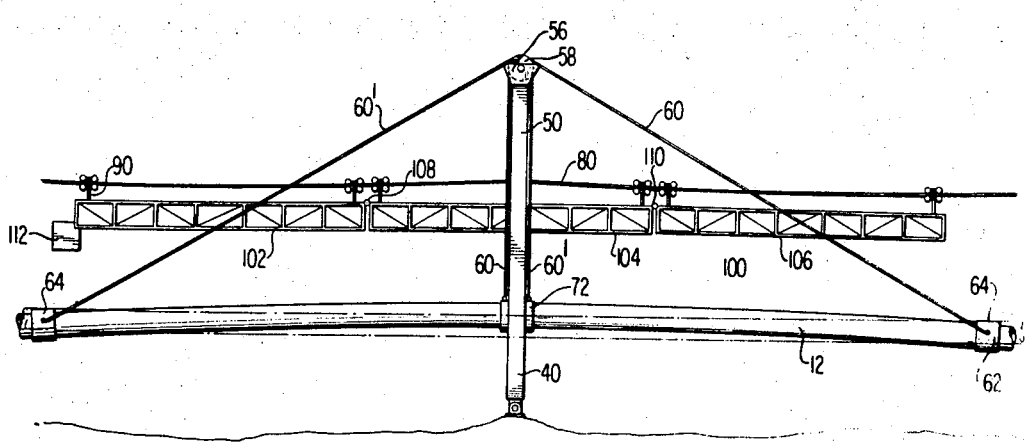
FIG. 7 is a side elevational view of a portion of the aerial pipeline and tramway.
Figure 8:
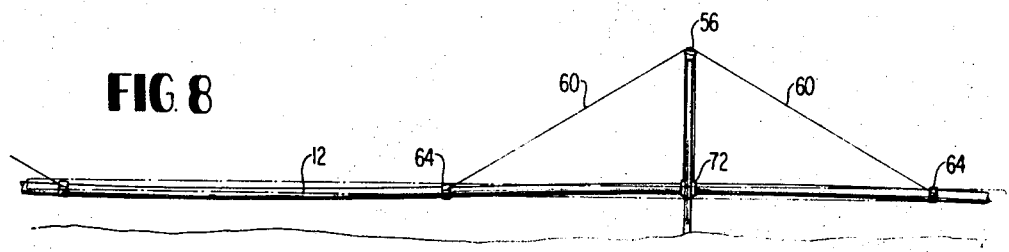
FIG. 8 is a perspective view of a portion of the aerial pipeline showing one form of expansion compensation.

As pointed out previously, with respect to FIG. 6a the support cables may merely be guided over pulleys on the top of each tower rather than be directly secured to the top of the towers. Such an arrangement is shown in FIGS. 7 and 8 wherein one pair of cables 60, only one of which is shown in the side view, are attached to the flanges 62 on sleeves 64 secured in turn to the pipeline 12. The pair of cables 60 extend upwardly over the pulleys 58 on the top of the upper tower section 50 and extend vertically downwardly on the opposite side of the tower and are connected to a pipeline supporting sleeve 72. In a similar manner, a pair of cables 60' are secured to the pipeline supporting sleeve 64 and extends upwardly over a pair of pulleys 58 in the opposite direction and vertically downwardly where they are secured to the pipeline supporting sleeve 72. This type of suspension system is suitable for pipelines having lesser load and distance factors and wherein the pipeline is arranged for movement in a verticle plane to compensate for expansion and load factors. Thus, as a portion of the pipeline moves from the dotted line position to the solid line position during loading and expansion, the section of the pipeline between the towers will tend to move downwardly as best shown in FIG. 8 and the porition of the pipeline immediately adjacent the towers will move upward. During this movement, the cables 60 and 60' will travel over the pulleys 58 to compensate for this pipeline deviation. If it is desired to limit the amount of pipeline deviation from the normal unloaded position, it is possible to secure suitable stop means to the vertical extending portions of the cables 60 and 60' for co-action with suitable complementary stop means on the tower. In addition to the cables which support the pipeline from the towers, additional cables 74 are provided to help stabilize the pipeline 12 in a lateral direction against wind forces. A wind boom 76 is secured to each tower leg 40 and 42 as best shown in FIGS. 1 and 6a, and the cables 74 are connected to the sleeves 64 on the pipeline and then fixed at the ends of the wind booms by any suitable means. A cable 74 is generally provided for each pair of support sleeves 64.

Figure 9:
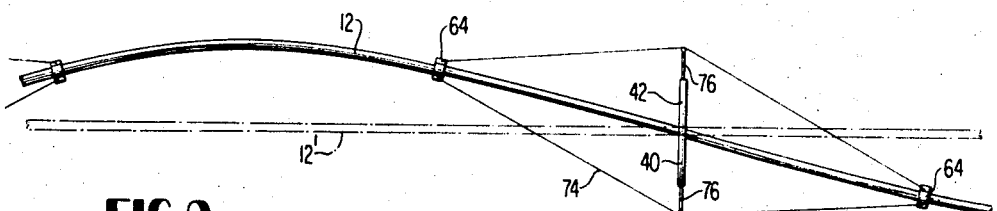
FIG. 9 is a top plan view of a portion of the aerial pipeline showing another form of expansion compensation.

In FIG. 9 a novel expansion system is provided for the pipeline wherein the thermal expansion and contraction takes place in a generally horizontal plane rather than in a vertical plane as shown in FIG. 8. When the pipeline is assembled, it is arranged in substantially a straight line as shown by the dotted line position 12' in FIG. 9. However, at the center of the span between each tower, the pipeline is formed with a very slight curvature in opposite horizontal directions so as to predispose the pipeline 12 for expansion to the position shown in solid lines in FIG. 9. The amount of expansion shown in FIG. 9 is exaggerated for purposes of illustration. By prearranging the pipeline for external expansion in the lateral direction, the pipeline will still be free for load deflection in the vertical direction. Thus, the thermal expansion and load deflection are not cumulative in the same direction.

A tramway cable 80 is arranged to extend along the entire length of the pipeline substantially parallel to the pipeline for the purpose of hauling in supplies during the construction of the pipeline and for later use as a support for a cable car which could be utilized for inspection and repair trips or for general passenger and supply transportation. The cable 80 is secured to the towers by means of a support bracket 82 as best shown in FIGS. 6a and 6c. The support bracket 82 is comprised of a half cylindrical sleeve 84, which is complementary to the tubular support leg of the tower and is secured thereto by welding or other suitable means. A pair of transversely extending cable supporting flanges 86 are secured to the sleeve 84 and are provided with suitable cable clamps 88 at the outermost ends thereof. The flanges 86 are substantially triangular in configuration with the cable clamping means 88 being located at the apex thereof so as to provide minimum interference with the trolley 90 which is adapted to travel along the cable 80. The trolley 90 may be provided with a pair of opposed rotatable sheaves 92 and 94 one of which may be spring biased relative to the other to accommodate irregularities in the cable diameter such as encountered at the cable supports and at cable splices. One of the sheaves 94 may be power driven so as to propel the trolley 90 along the cable. The trolley mechanism and the various means which may be utilized to drive the same have not been shown in detail since they are generally well known in the art and the details as such do not form part of the present invention. Any suitable cable car, trolley means or the like may be supported from the trolley member 90 and will be dimensioned in such a manner as to pass between the vertical support cables 60 as shown in FIG. 6a.

The cable 80 is useful during the construction of the pipeline as best shown in FIGS. 3 and 4. As described previously with respect to FIG. 3, the supplies may be brought into the pipeline right-of-way from a supply depot by means of a portable tramway cable 18 strung between lightweight portable support towers 14. In FIG. 3, two permanent towers 10 have already been erected and for construction purposes, the main cable 80 may be connected to one or more portable support towers 14 which will provide an extension of the construction tramway to the location of future main tower sites. The end of the cable 80 may be anchored temporarily by any suitable means. The main support towers 10 may be assembled at the site or brought in in a completed form and pinned to the support plates 30 while laying on the ground. The cable 80 may be secured to the support towers in the manner shown in FIG. 6a while the towers are on the ground and a plurality of towers may be erected simultaneously by pulling on the remote end of the cable by any suitable means such as a portable engine. As the slack in the cable 80 is picked up, the towers will pivot to the upright position and upon anchoring of the cable 80 the tramway will be effectively extended by a length equal to the number of towers erected.

A multiple section hinged trolley beam 100 is shown in FIG. 7 and is comprised of three substantially identical sections 102, 104 and 106. The sections 102 and 104 are hinged at 108 and the sections 104 and 106 are hinged at 110. Each section of the trolley beam is supported by a pair of trolley members 90 which are supported by cable 80 for movement therealong. A suitable control cab or platform 112 may be provided at one end of the multiple section trolley beam 100 and suitable motive power means (not shown) may be provided for propelling the trolley beam along the cable 80.

A portable construction and assembly station is shown in FIG. 4 and this is comprised of any suitable housing 114 which will provide an enclosure for welding a plurality of rlatively short standard pipe lengths 116 into a relatively long integral multiple section pipeline 118. This will reduce the number of welds necessary in the field. The elongated section 118 may also be coated, insulated or subjected to any other necessary pre-treatment within the enclosure 114. It is advantageous to provide two assembly lines 120 and 122 within the enclosure 114 with the pipe being fed in opposite directions. Such an arrangement effectively doubles the capacity of the assembly station and the prefabricated pipe lengths 118 are removed from the enclosure 114 parallel to the pipeline right-of-way so as to facilitate handling thereof. The pipeline sections 118 may be supported from the multiple section trolley beam 100 by cables 124 in a manner which will evenly distribute the weight of the elongated pipeline section 118. Due to the fact that the cable 80 will tend to sag between the towers 10, the multiple section trolley beam 100 will efficiently distribute the weight of pipeline section 118 along the cable and will pivot at hinge locations 108 and 110 to conform to the sag in the cable.

The pipeline sections 118 are then transported along the erected portion of the cable 80 into position for connection with the previously assembled pipeline. The operation for assembling the pipeline sections 118 onto the previously constructed pipeline 12 is best shown in FIG. 5 wherein two pipeline sections 118 are supported by trolley beams 110 in alignment with the previously assembled pipeline 12. Portable enclosures 130 may be disposed about the connection points to provide protection for the workers during the welding operation and provide extra strong line-up clamps for structural support in joining the sections of pipeline together. These enclosures also have adjustable legs to support the enclosure and the part of pipeline being welded wherever this may be desired. Subsequent to the joining of the section 118 to the pipeline 12, the support sleeve 64 may be secured to the newly joined pipeline sections and cables secured between the towers and the sleeves in the manner described above. Once the weight of the pipeline is taken by the support cables 70, the cables 124 may be removed and the trolley beams 110 returned to the assembly station to pick-up additional sections of pipe 118. Thus, it is seen that the entire pipe line may be constructed without the necessity of providing access roads, a factor which is extremely beneficial and economical in rock terrain and in permafrost areas.

Subsequent to the completion of the pipeline the cable 80 may be left in place to provide a tramway along the entire length of the pipeline for inspection or general transportation purposes. A small inspection cable car 140 is shown in FIG. 1 which will enable frequent inspections of the pipeline with ease to minimize the risk of leaks or other damage going undetected for long periods of time. Suitable repair equipment may also be brought in via the cable 80, so that repairs may be effected quickly and economically, once again minimizing the danger of a massive oil spill which would be harmful to the ecology. It is also contemplated that the cable 180 could be utilized to support cable cars for general transportation purposes in carrying passengers and supplies to remote and inaccessible locations. Once again, by providing means for bringing supplies into remote areas by means of the cable 180 which is supported by the same tower system that supports the pipeline, it will be unnecessary to build vehicle roadways or railroads over rock and inaccessible terrain. If the cable 80 is used for general transportation purposes, the periodic dip in the cable between the towers might prove to be a detriment since the speed of the cable car would be limited and the up and down motion would be annoying to passengers. It is therefore contemplated that a lightweight rigid mono-rail could be supported from the cable 80 in a generally flat, horizontal path. Thus, a high speed mono-rail car could be operated thereon to provide quick and dependable transportation without the unpleasant swaying and up and down movement necessary attendant to a cable type tramway.

The present method supporting the pipeline is far superior to all other methods of pipeline construction, such as buried pipelines or pipelines supported upon a rigid trestle. In the present system the axial stress is small compared to the bending stress and therefore, the present system can be considered an unrestrained system as per the U.S.A. standard code for pressure piping. According to this same code, if the expansion is not absorbed by direct axial compression of the pipe, as is the case in underground pipelines or restrained above ground pipelines, flexibility must be provided by the use of bends, loops or offsets or provision must be made to absorb thermal strains by expansion joints or couplings. In calculating the stress values of the present system, it was found that all of the stresses due to expansion and longitudinal stress due to pressure, weight, and other sustained external loading are well within the limits set forth by the code.

The triangular shape of the towers and the cable suspension support provide the best structural combination possible for "dampening out" harmful vibrations due to wind or earthquakes.

The heights of the towers, according to the present invention can vary depending upon the specific requirements but in most instances it is contemplated that the pipeline will be supported a minimum of 15 feet above the ground, thereby minimizing the danger of damage to the pipelines by people or animals. Furthermore, the use of the unrestrained system allows the pipeline to flex considerably but the connected lateral and vertical cables serve to "dampen out" any tendency to create a large or dangerous vibration amplitude during any earthquake thereby minimizing the chances of pipeline rupture. Even if one or more towers were to collapse for any reasons, such as an earthquake or the like, the pipeline is provided with suitable flexibility that it would be possible for the pipeline to rest on the ground without rupture.

In addition to providing a means of transportation on the pipeline right-of-way, the present tower system also may be used for supporting communication for power cables 150 thereby eliminating the necessity for erecting separate towers for this purpose. It is also possible that micro-wave relay stations could be mounted on top of the various towers.

The foregoing embodiments are merely examples of the present invention and it is obvious that many other variations are possible within the scope of the appended claims.

What is claimed is:

1. A method of constructing an aerial pipeline comprising
   a. providing a plurality of pairs of spaced apart supports at each tower location along the right of way,
   b. arranging a plurality of said towers having legs disposed in an inverted V-shape configuration substantially horizontally adjacent each of said plurality of pairs of supports with the apices all pointing in the same direction along the right of way and with the legs pivotally secured to said supports about an axis transverse to said right of way,
   c. connecting a cable to each of said towers between the legs thereof adjacent the apex of the V-shaped configuration and
   d. pulling on said cable in a direction opposite to the direction said apices point to simultaneously raise said plurality of towers into a verticle position.

2. A method as set forth in claim 1, further comprising
   e. conveying sections of pipeline into position along said cable into axial alignment,
   f. joining adjacent sections of aligned pipeline, and
   g. connecting said pipeline to said towers.

* * * * *